United States Patent [19]
Ishikawa et al.

[11] Patent Number: 5,807,590
[45] Date of Patent: Sep. 15, 1998

[54] EXTRUDING DIE FOR A HONEYCOMB STRUCTURE

[76] Inventors: Tokitsugu Ishikawa, 31, 4-chome, Shinmichi-cho; Tomoshi Sumiya, 1, 3-chome, Asama-cho, both of Hekinan-shi, Aichi-ken, Japan

[21] Appl. No.: 857,201

[22] Filed: May 15, 1997

[51] Int. Cl.⁶ .................................................. B29C 47/00
[52] U.S. Cl. ....................... 425/190; 425/464; 264/177.12
[58] Field of Search ....................... 264/177.12; 425/182, 425/186, 464, 465, 466, 467, 190

[56] References Cited

U.S. PATENT DOCUMENTS

| | | | |
|---|---|---|---|
| 4,343,604 | 8/1982 | Minjolle | 425/467 |
| 4,846,657 | 7/1989 | Chao | 264/177.12 |
| 4,979,889 | 12/1990 | Frost | 264/177.12 |
| 5,108,685 | 4/1992 | Kragle | 264/177.12 |
| 5,388,979 | 2/1995 | Harmer | 425/451.9 |

*Primary Examiner*—Jay H. Woo
*Assistant Examiner*—Robert Hopkins

*Attorney, Agent, or Firm*—Dennison, Meserole, Pollack & Scheiner

[57] ABSTRACT

The object is to provide an extruding die which is easy to be cleaned and which suffers no unreasonable force during the extrusion.

The extruding die for extruding a honeycomb structure comprises at least two components, a first component and a second component, which are detachable. The first component includes a plurality of supporting bars disposed parallel to each other at regular intervals each of which has hexagonal posts erected thereon at regular intervals. The second component includes a plurality of supporting bars disposed parallel to each other at regular intervals, each of which is fitted in the channels formed on the lower surfaces of the hexagonal posts of the first component, and each of which has hexagonal posts erected thereon at regular intervals and disposed parallel to each other between the hexagonal posts of the first component. The first and the second component, in the condition assembled into a unit, form cell holes like a honeycomb continuously extending from the rear surface to the front surface in the same diameter.

2 Claims, 21 Drawing Sheets

EXTRUDING DIE FOR A HONEYCOMB STRUCTURE

BACKGROUND OF THE INVENTION

1. Field of the Invention

The present invention relates to an extruding die for extruding a honeycomb structure.

2. Description of the Prior Art

The honeycomb structures are used, for example, as automotive catalyst carriers and in particular the honeycomb structures H having a plurality of six-sided cells as shown in FIG. 20 are mostly used for that purpose because of the large surface area and high strength thereof. In the prior art of such a honeycomb structure, it is made from raw material such as ceramic powder and binder, for example, by extruding through an extruder, in which used is an extruding die 51 as shown in a sectional side view of FIG. 21 and in a schematic front view of FIG. 22. Referring to an enlarged perspective view of the principal portion of FIG. 23, this extruding die 51 in the prior art is manufactured in the process that the honeycomb pattern is machined on the front surface of the die by electron discharge method with a discharge electrode to form hexagonal posts 52, 52, and thereafter the feed paths 54, 54 are formed from the rear surface thereof by drilling work. Cell holes 53, 53 formed among the hexagonal posts 52, 52 are made to communicate with the feed paths 54, 54 in an eccentric condition. To form the honeycomb structure H as shown in FIG. 20, the material is extruded from the feed paths 54 toward the cell holes 53. The honeycomb structure H is provided with hexagonal holes Ha, Ha formed by a plurality of hexagonal post 52, 52.

Since the extruding die 51 of the prior art is formed in a unit by machining a honeycomb pattern on the front surface of the die by the electron discharge method and thereafter by drilling work on the rear surface thereof, it is apt to occur any machining error such as misalignment of the centers, often resulting in a bad effect upon the start of the extrusion. Besides, since the material is extruded from the feed paths 54 to the cell holes 53 as it passed through the different sections, any residual stress is remained in the extruded honeycomb structure H, it resulting in the cause of cracks, strains or the like when the die is dried.

Further, in the extruding die 51 of the prior art, the producting cost is large because of the intricate structure, the cleaning takes much time because of the narrow gap of the cell holes 53 formed among the hexagonal posts 52, 52, and the complete cleaning for the interior of the die is difficult even by using an ultrasonic cleaning machine or the like because the cell holes 53 and feed paths 54 are in an eccentric condition and the inner paths are intricate.

Still further, since the extruding die 51 of the prior art is in a monolithic structure, it is impossible to perform the plating or coating for the interior, and it is very difficult to perform any additional working and partial repair which may be necessary after actually confirming the extruded condition of the honeycomb structure H.

SUMMARY OF THE INVENTION

The present invention is originated in the light of the above described faults, and it is accordingly an object of this invention to provide an extruding die which is easy to be dismantled and reassembled so that it may be cleaned without such difficulty as in the prior art. Another object of this invention is to provide an extruding die which has cell holes extending continuously from the rear surface to the front surface in the same diameter and suffers no unreasonable force during the extrusion so that it can effectively prevent cracks and strains from occurring on the product. A further object of this invention is to provide an extruding die which can be partially machined by dismantling the die in case the same extruding speed can not be obtained in some area of the extruding die during the extrusion.

Accordingly, the subject matter of the present invention is an extruding die to be fitted in the peripheral retainer secured to an extruder for extruding a honeycomb structure: comprising at least two components, a first component and a second component, which are detachable, said first component including a plurality of supporting bars disposed parallel to each other at regular intervals each of which has angular-sectioned posts erected thereon at regular intervals, said second component including a plurality of supporting bars disposed parallel to each other at regular intervals each of which is fitted in the channels formed on the rear surfaces of said angular-sectioned posts of said first component and each of which has angular-sectioned posts erected thereon at regular intervals and disposed parallel to each other between said angular-sectioned posts of said first component, and said first and said second component in the condition assembled into a unit forming cell holes like a honeycomb continuously extending from the rear surface to the front surface in the same diameter among a plurality of angular-sectioned posts of said first and said second component.

DETAILED DESCRIPTION OF THE PREFERRED EMBODIMENT

Referring to the attached drawings of the embodiments, the present invention will be described hereinafter.

Figure 1:
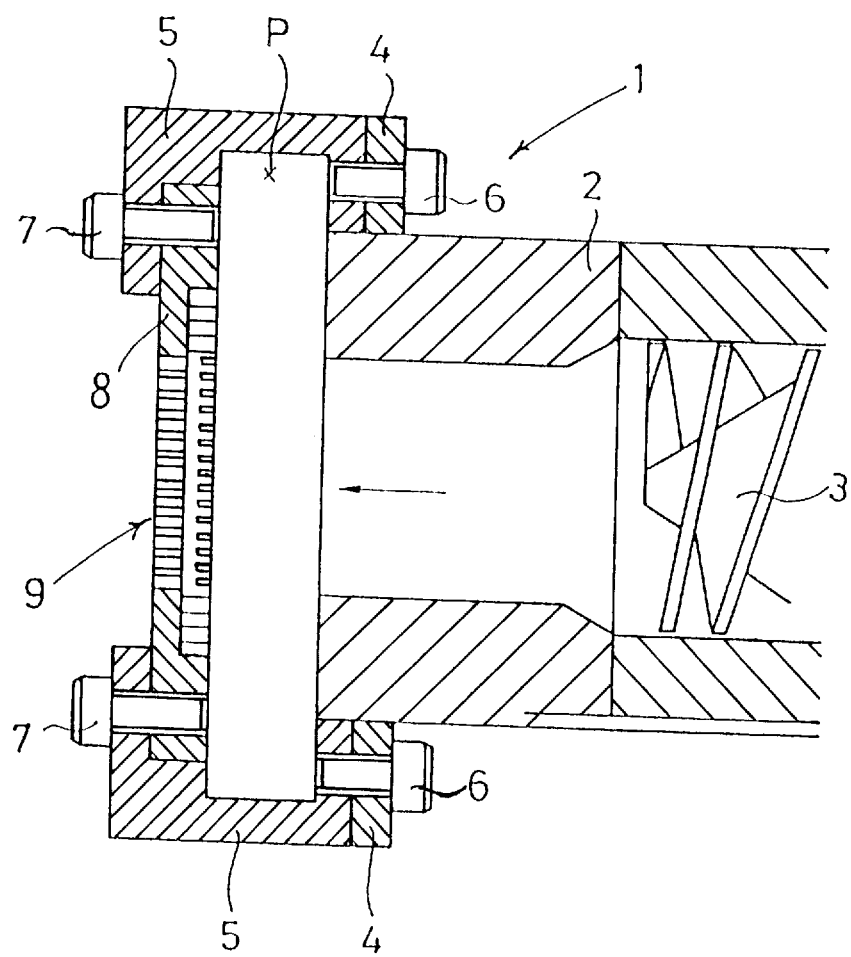
FIG. 1 is a sectional view of the principal portion of an extruder.

In a sectional view of FIG. 1, there is shown the principal portion of an extruder 1, which has a cylinder 2 and a screw 3 which is rotatably provided in the cylinder. The extruder 1 is constituted so that the material may be extruded by the screw 3 through the cylinder 2 toward a die 9. Secured on the periphery of the end of the cylinder 2 is a fixing member 4 projecting outward, to which an outer frame 5 is attached for being opened and closed through bolts 6, 6. Around the inner periphery of this outer frame 5 there is formed a sleeve P so that its diameter may be fairly larger than the inner diameter of the cylinder 2. At the end of this sleeve P, a peripheral retainer 8 is fixed to the outer frame 5 through bolts 7. The extruding die 9 is fitted in the peripheral retainer 8. This extruder 1 may use a piston instead of the screw 3.

Incidentally, some of the material in the periphery of the extruder 1 may become hard and change into small lumps because of frictional heat during the extrusion. However, since the extruder 1 is provided with the sleeve P of the wide diameter, it is possible to keep the small lumps of the material in the sleeve P and remove the stuck lumps by opening the sleeve P in a quick operation. That is, the extruder 1 is designed so as to prevent small lumps of the material from sticking in the die 9 and constituted so as to enable the continuous extrusion for many hours.

Figure 2:
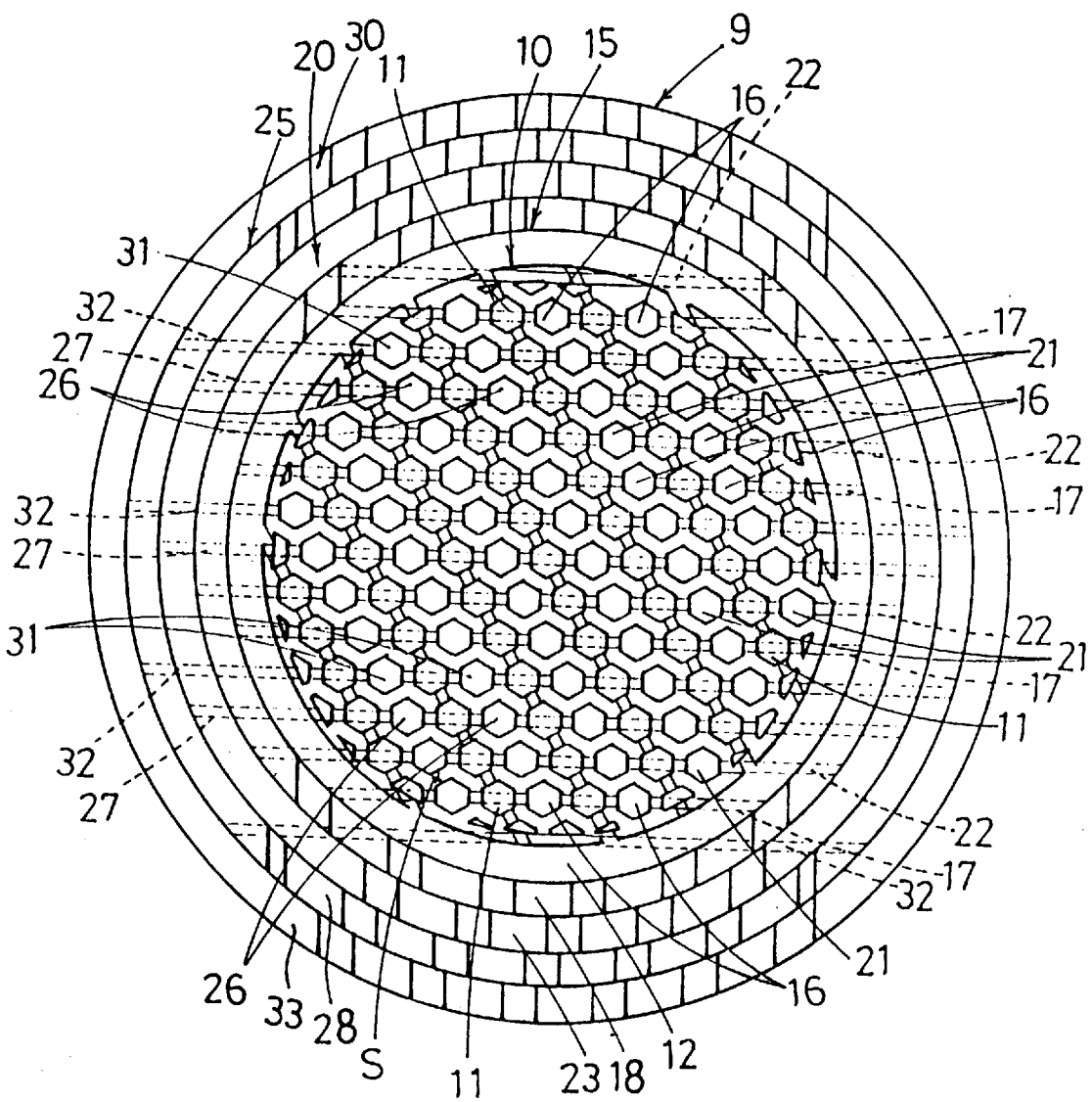
FIG. 2 is an enlarged front view of a die according to the present invention to be mounted on the extruder.
Figure 5:
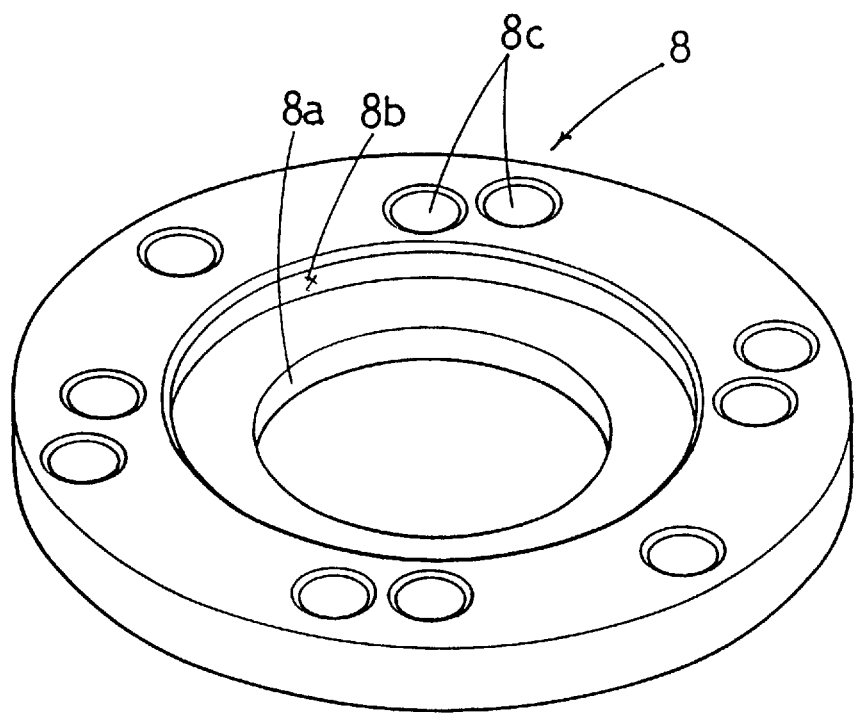
FIG. 5 is a perspective view of a peripheral retainer for mounting the die.

The peripheral retainer 8 has a structure as shown in FIG. 5, in the center of which a centeral hole 8a is formed in a penetrating condition, the periphery of the hole is provided with a fitting recess 8b in the rear side, and in the flange portion around the recess there are formed bolt holes 8c, 8c for the bolts 7, 7. The extruding die 9 is fitted in this peripheral retainer 8 from the rear side. The extruding die 9 in this embodiment is composed of detachable five components, which are assembled in a unit and securely fitted in the fitting recess 8b in a flush condition. The front view of the extruding die 9 is shown in FIG. 2, and the respective components constituting the die 9 will be described later in detail.

In this embodiment, the extruding die 9 is composed of five components which are detachable and capable of reassembling, so that it is easy to be cleaned with a brush or the like after dismantling the die. Besides, the extruding die 9 can be additionally machined if necessary after the extruding condition is confirmed by accutually performing the extrusion through the die 9 mounted on the extruder 1. For example, in case the extrusion can not be performed in the same speed in the central and the peripheral portion of the extruding die 9, it can be machined so as to make the speed equal by adding a variety of unevenness in the thickness of the die 9.

Figure 3:
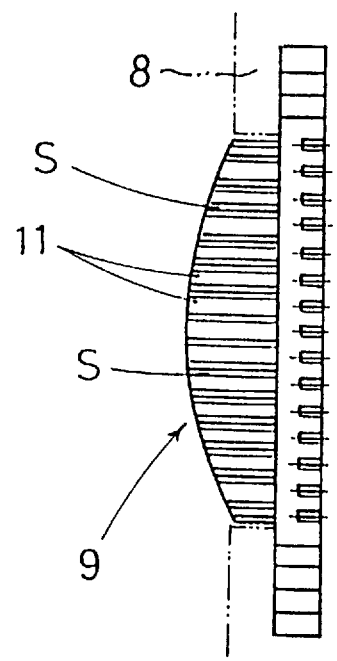
FIG. 3 is a side view of a die additionally worked into a projected form at the center.
Figure 4:
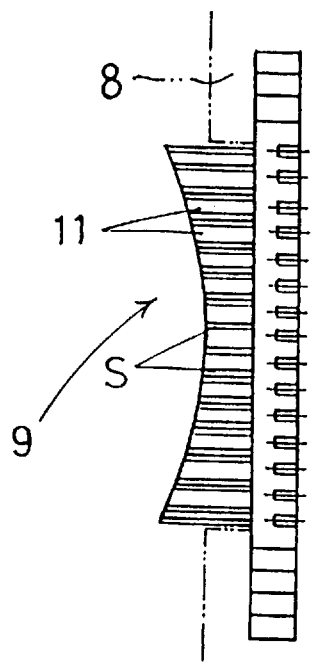
FIG. 4 is a side view of a die additionally worked into a recessed form at the center.

Namely, a number of the hexagonal posts 11 at the end of the extruding die 9 are previously formed in a long size, and thereafter those posts 11 are additionally machined into a projected form in the central portion like a convex mirror as shown in FIG. 3. In contrast with this, those posts 11 may be also additionally machined into a recessed form in the central portion like a concave mirror as shown in FIG. 4. In case the extruding speeds are not equal locally, it is possible to perform necessary machining only on some of the components after dismantling the extruding die 9 into the respective components.

Moreover, the extruding die 9 is provided with cell holes S formed in the same diameter straight from the rear surface toward the front surface so that it suffers no unreasonable force during the extrusion in comparison with the die in the prior art of which the cell holes 53 and the feed paths 54 are arranged in an eccentric condition. As a result, the extruding die 9 is constituted so as to reduce cracks and strains in the extruded honeycomb structure H.

Figure 6:
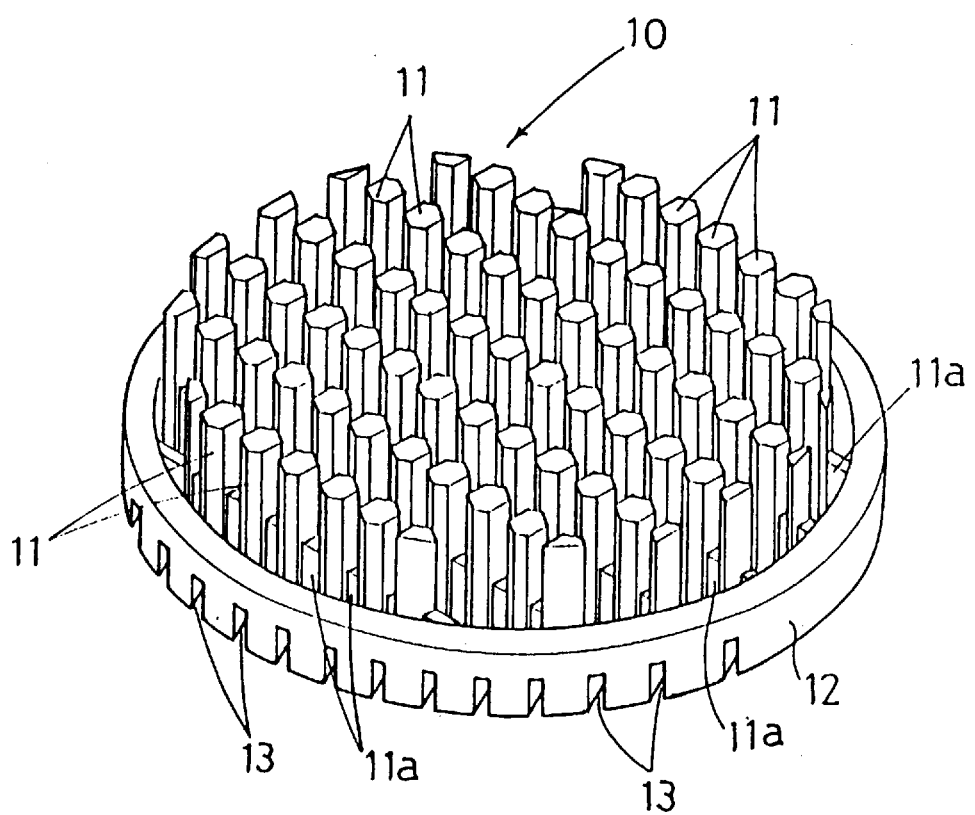
FIG. 6 is a perspective front view of a first component.
Figure 8:
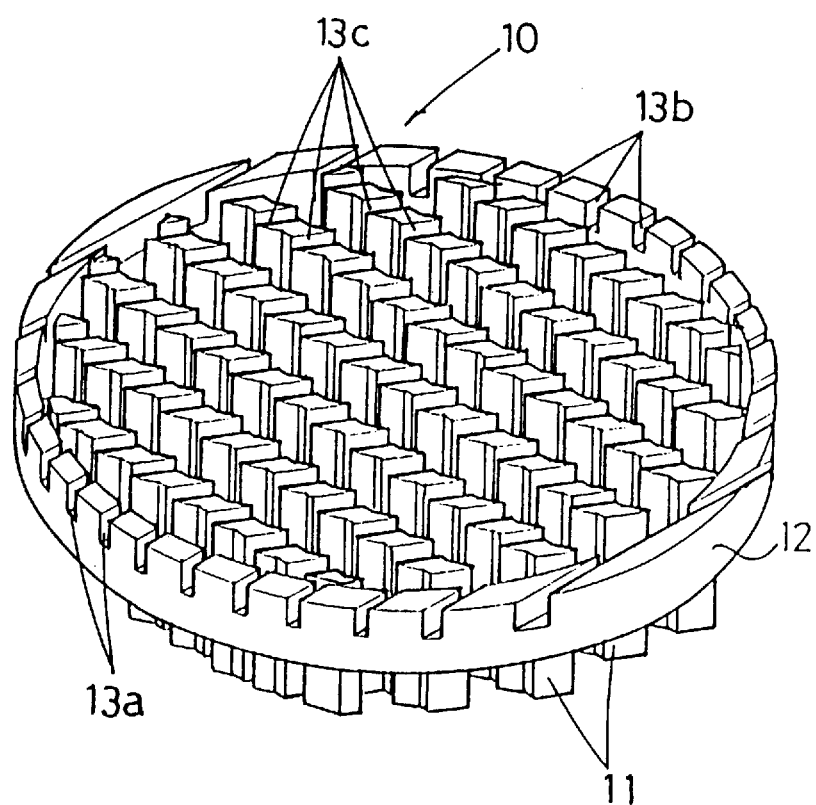
FIG. 8 is a perspective rear view of a first component.

Now, a first component 10 constituting the extruding die 9 is shown in a perspective front view of FIG. 6 and a perspective rear view of FIG. 8.

Figure 7:
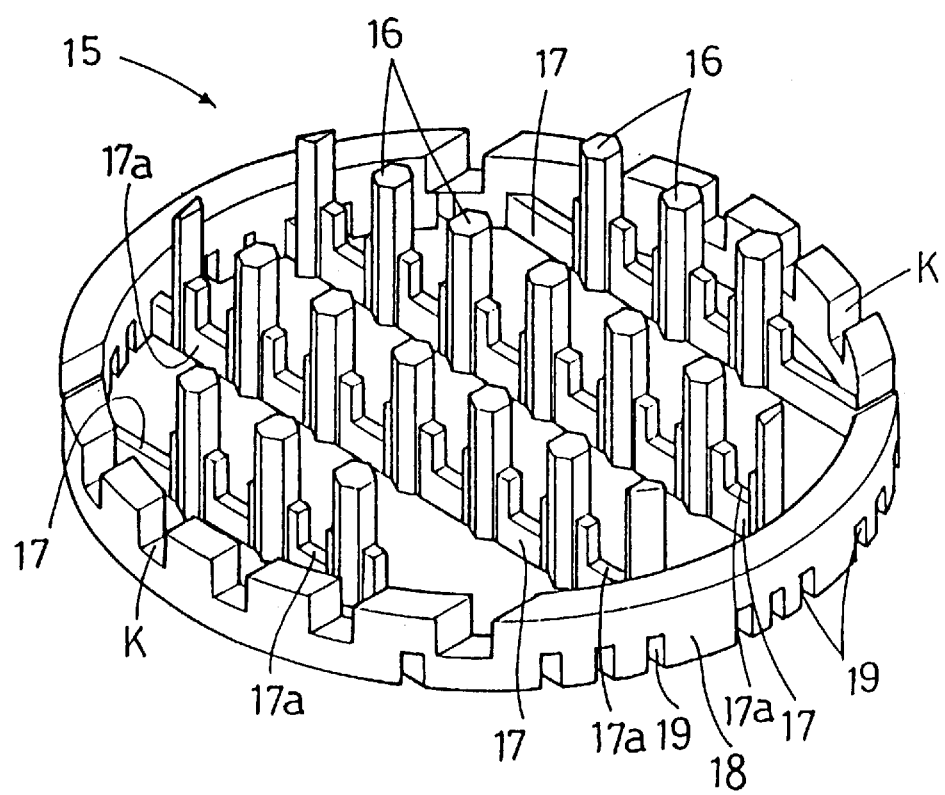
FIG. 7 is a perspective front view of a second component.
Figure 9:
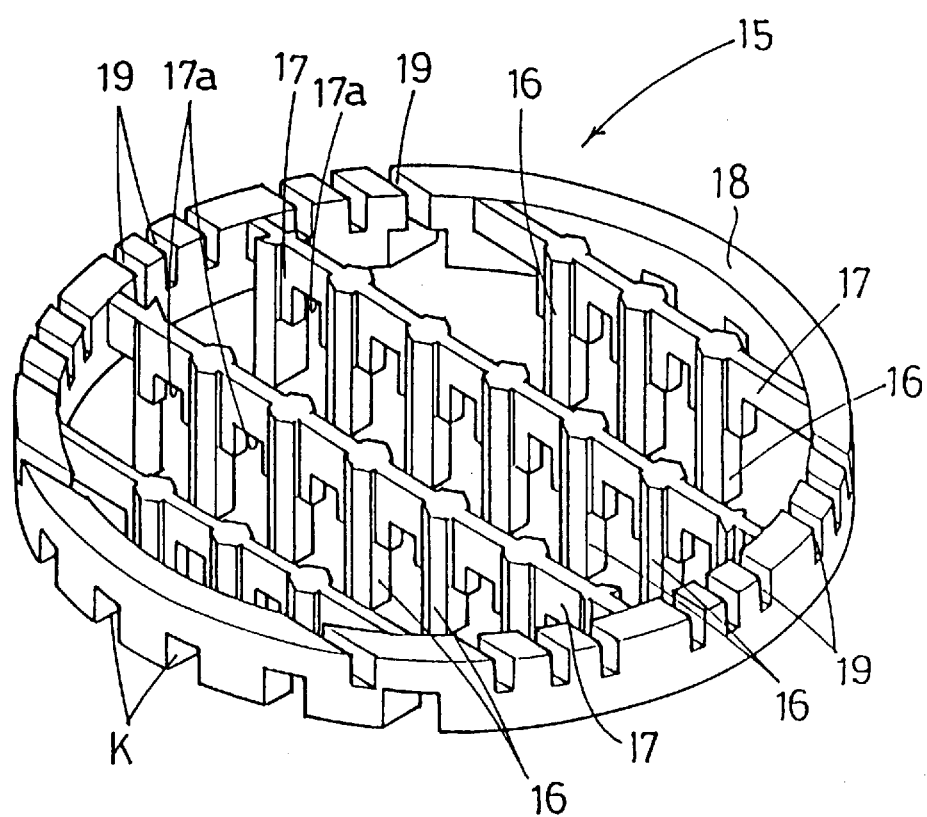
FIG. 9 is a perspective rear view of a second component.

Also, a second component 15 is shown in a perspective front view of FIG. 7 and a perspective rear view of FIG. 9.

Figure 11:
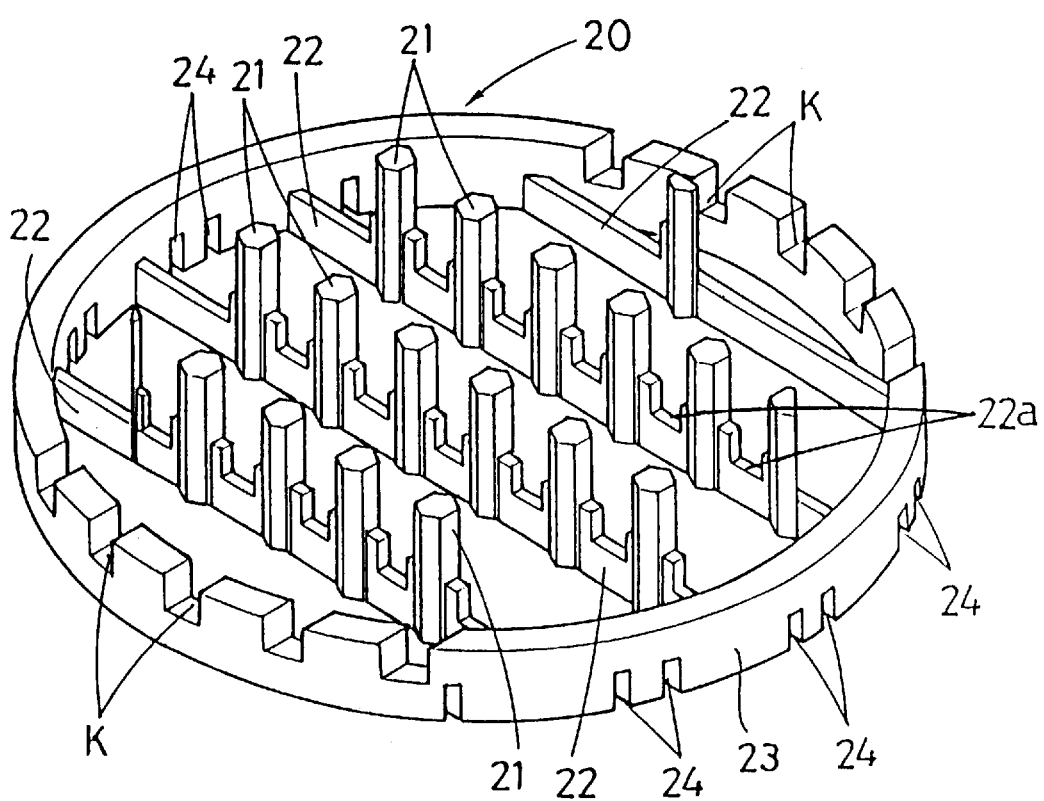
FIG. 11 is a perspective front view of a third component.
Figure 13:
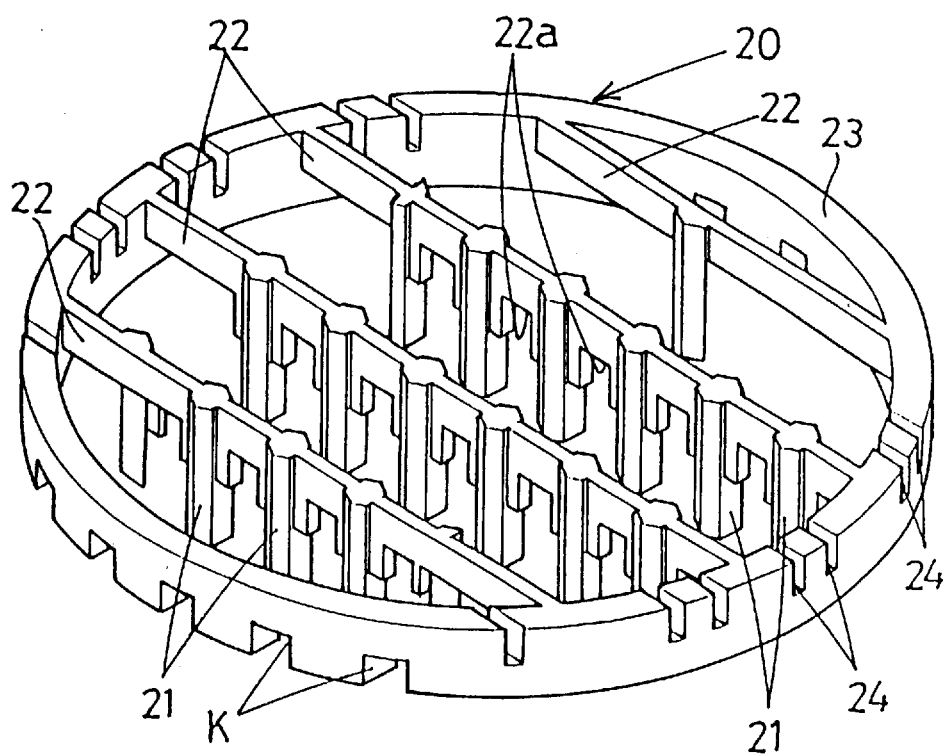
FIG. 13 is a perspective rear view of a third component.

Also, a third component 20 is shown in a perspective front view of FIG. 11 and a perspective rear view of FIG. 13.

Figure 12:
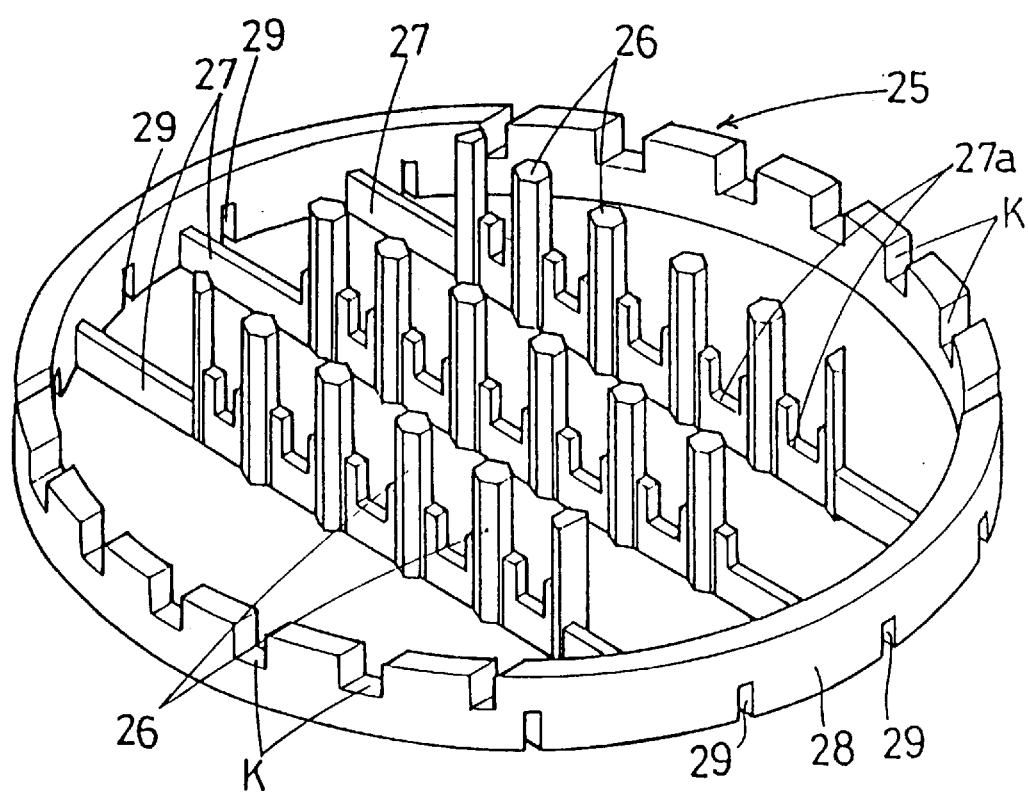
FIG. 12 is a perspective front view of a fourth component.
Figure 14:
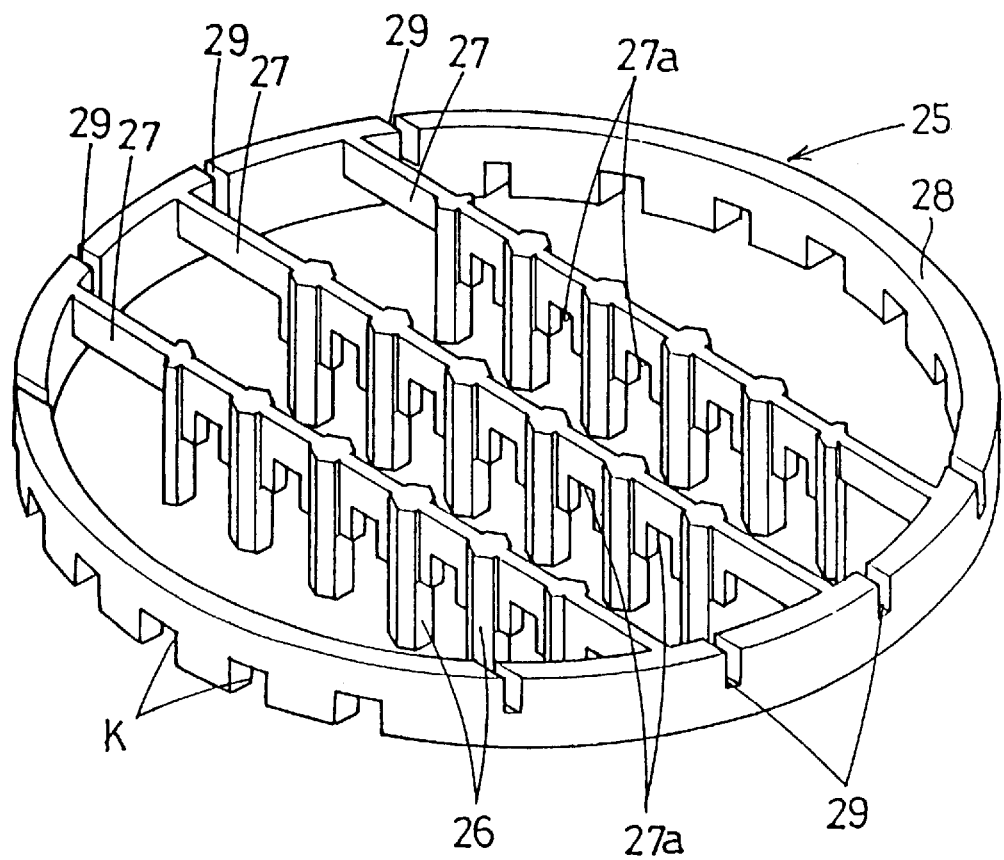
FIG. 14 is a perspective rear view of a fourth component.

Also, a fourth component 25 is shown in a perspective front view of FIG. 12 and a perspective rear view of FIG. 14.

Figure 15:
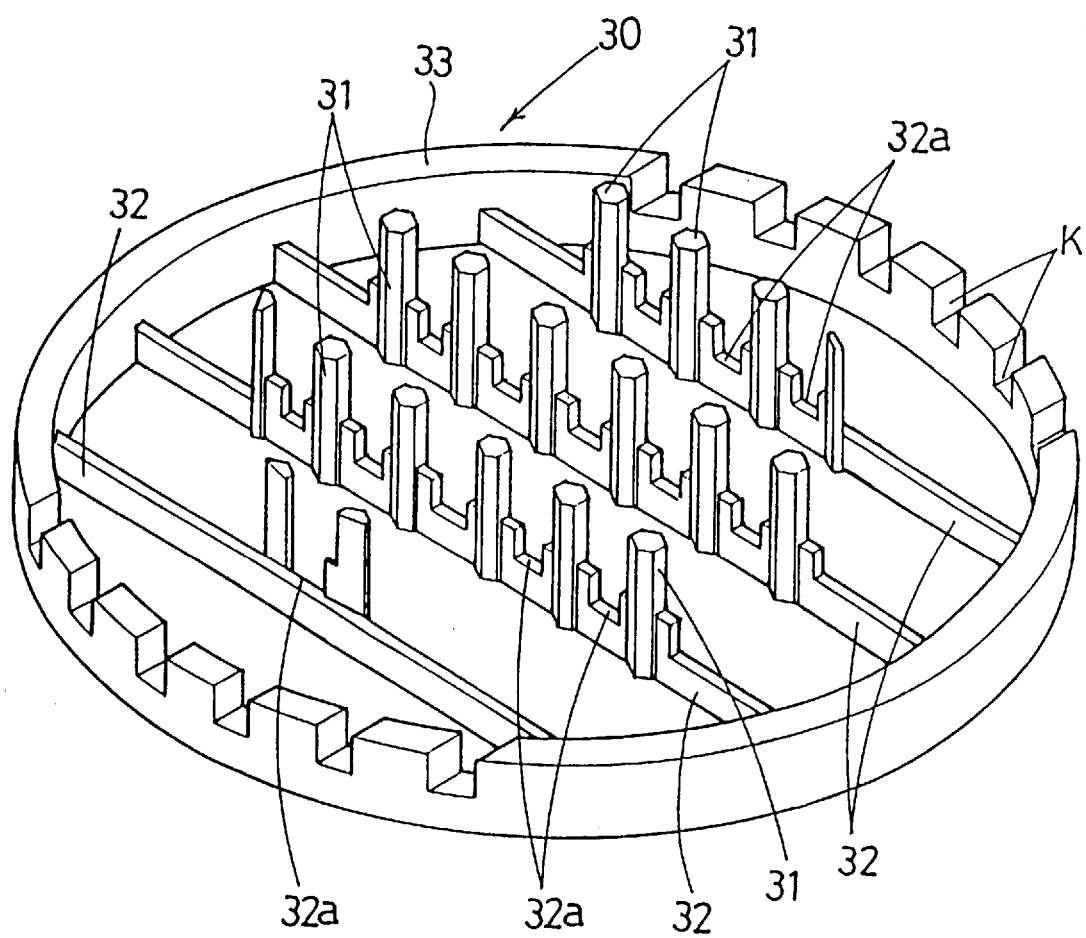
FIG. 15 is a perspective front view of a fifth component.
Figure 16:
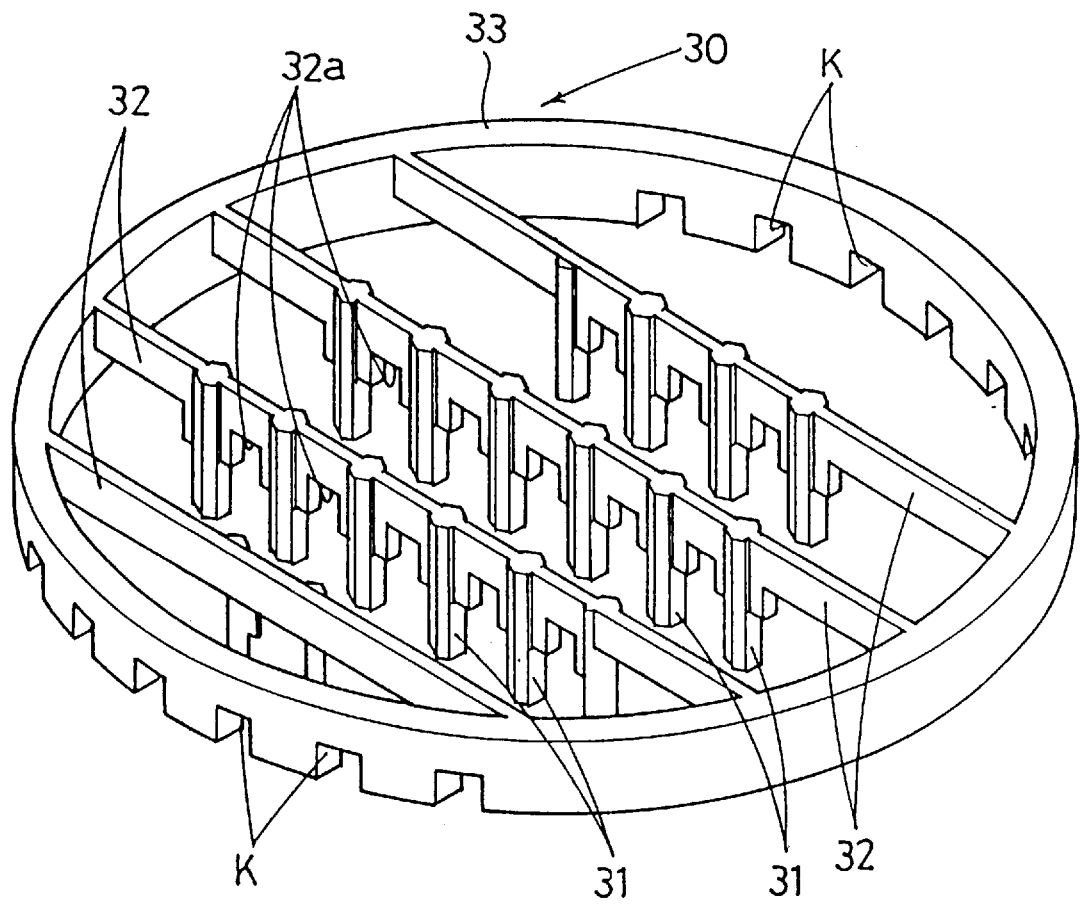
FIG. 16 is a perspective rear view of a fifth component.

Also, a fifth component 30 is shown in a perspective front view of FIG. 15 and a perspective rear view of FIG. 16.

Figure 10:
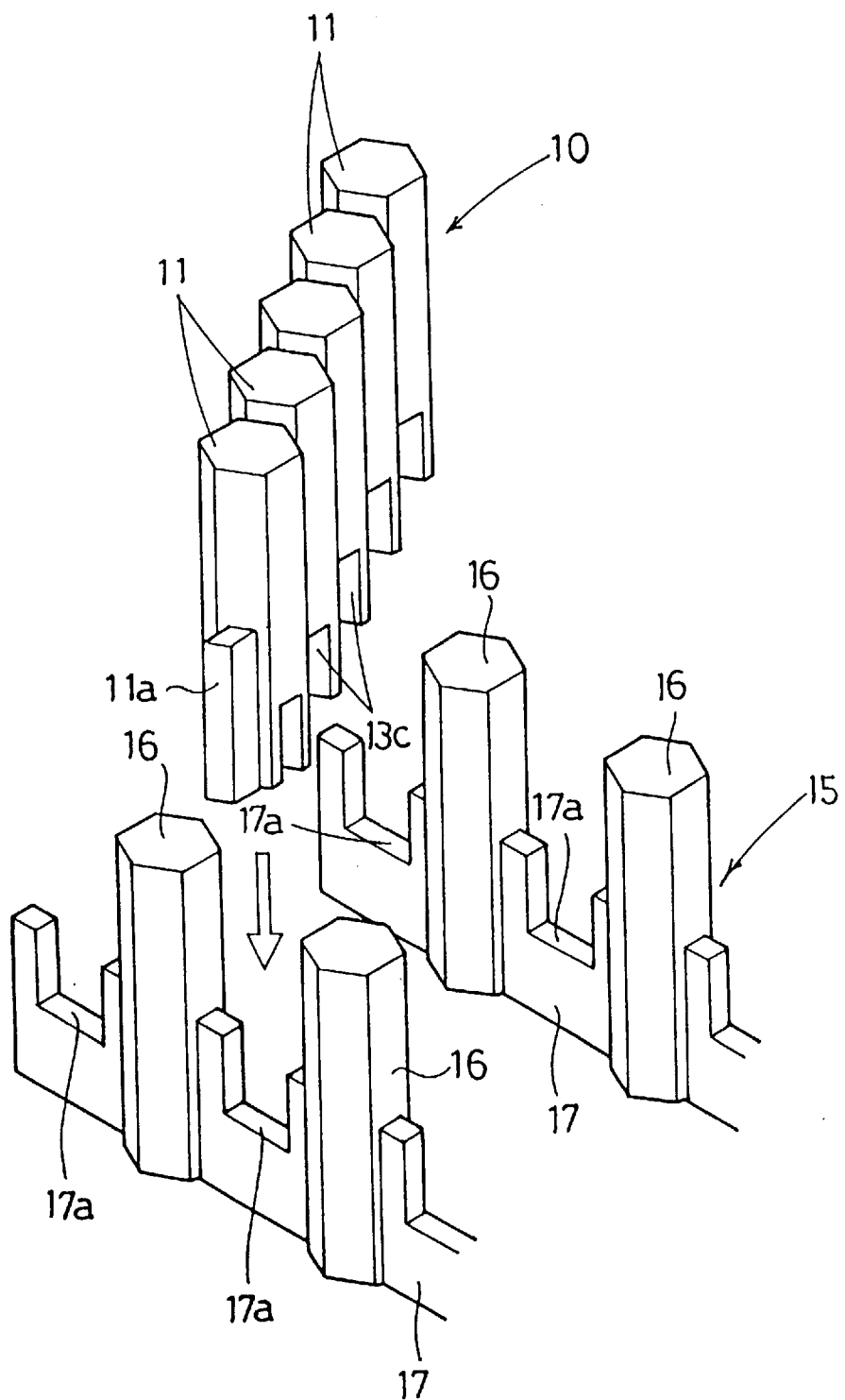
FIG. 10 is a enlarged view of the principal portion showing an assembling structure of the first and the second component.

First of all, referring to FIG. 6 and FIG. 8, the first component 10 will be described. The first component 10 is provided with a ring portion 12 formed in the periphery thereof. Within the ring portion 12, seven pieces of supporting bars 11a, 11a are disposed parallel to each other at regular intervals, each of them having hexagonal posts 11, 11, projecting in the front direction, erected thereon at regular intervals. The hexagonal posts 11, 11 are respectively provided with channels 13c, 13c formed on the rear surfaces thereof (see the enlarged view of FIG. 10). Also, the ring portion 12 is provided with a plurality of channels 13a, 13a and channels 13b, 13b respectively formed on the rear surface thereof, each of which channels 13a, 13b is arranged oppositely on the ring portion 12 and aligned with the channels 13c, 13c.

The first component 10 is formed by a wire-cut type electric spark machine. That is, by the wire-cut machining, the above-described hexagonal posts 11, 11 are formed at regular intervals in the longitudinal and lateral directions and also the above-described channels 13a, 13b, 13c are formed in a line. After the machining, hardening may be performed.

Next, referring to FIG. 7 and FIG. 9, the second component 15 will be described. The second component 15 is provided, within a ring portion 18 in the outer periphery thereof, with four pieces of supporting bars 17, 17 disposed parallel to each other at regular intervals, each of which has a plurality of hexagonal posts 16, 16 erected thereon at regular intervals. Each of the supporting bars 17, 17 is provided with engaging recesses 17a, 17a respectively formed between the hexagonal posts 16, 16. Also, the ring portion 18 is provided with a plurality of channels 19, 19 formed oppositely on the rear surface thereof. The respective channels 19, 19 are formed in the positions aligning with the channels 13a, 13a of the first component 10 when the ring portion 18 is fitted into the outer periphery of the ring portion 12 of the first component 10.

For fitting the second component 15 into the first component 10 from the rearside, the ring portion 18 of the second component 15 is fitted into the outer periphery of the ring portion 12 of the first component 10 as described above. At the same time, each of the supporting bars 17 of the second component 15 is fitted in the predetermined channels 13a, 13b, 13c formed in the first component 10, so that both the ring portions 12, 18 are integrally connected in a flush condition. At this time, as shown in the enlarged view of FIG. 10, the channels 13c, 13c formed on the rear surface of the respective hexagonal posts 11 of the firsr component 10 and the engaging recesses 17a, 17a of the second component 15 are engaged with each other so as to form a secure fitting condition without loosening. In this fitting condition, as shown in the front view of FIG. 2, the hexagonal posts 16, 16 of the second component 15 are disposed in parallel at regular intervals among the predetermined hexagonal posts 11, 11 of the first component 10. That is, when the second component 15 is fitted in the first component 10, four rows (number of the supporting bars) of the hexagonal posts 16, 16 are fitted in and disposed among the hexagonal posts 11, 11 of the first component 10.

Incidentally, in FIG. 7 and FIG. 9, K is a cut-out, which is formed when the hexagonal posts 16, 16 and the engaging recesses 17a, 17a are formed with a wire-cut type electric spark machine.

Next, referring to FIG. 11 and FIG. 13, the third component 20 will be described. The third component 20 is provided, within a ring portion 23 in the outer periphery thereof, with four pieces of supporting bars 22, 22 disposed parallel to each other at regular intervals, each of which has a plurality of hexagonal posts 21, 21, projecting in the front direction, erected thereon at regular intervals. Each of the supporting bars 22, 22 is provided with engaging recesses 22a, 22a respectively formed between the hexagonal posts 21, 21. Also, the ring portion 23 is provided with a plurality of channels 24, 24 formed oppositely on the rear surface thereof. The respective channels 24, 24 are formed in the positions aligning with the channels 13, 13 and 19, 19 of the first component 10 and the second component 15 respectively.

This third component 20 can be fitted in the second component 15 from the rearside, and in the fitted condition the ring portion 23 is fitted into the outer periphery of the ring portion 18 of the second component 15. At the same time, each of the supporting bars 22 is fitted in the predetermined channels 13a, 13b, 13c of the first component 10 and in the predetermined channels 19, 19 of the second component 15, so that those ring portions 12, 18, 23 are integrally connected in a flush condition. At this time, the channels 13c, 13c formed on the rear surface of the respective hexagonal posts 11 of the firsr component 10 and the engaging recesses 22a, 22a of the third component 20 are engaged with each other so as to form a integral fitting condition. In this fitting condition of the third component 20, as shown in the front view of FIG. 2, four rows of the hexagonal posts 21, 21 are disposed among the predetermined hexagonal posts 11, 11 of the first component 10.

Incidentally, the positions of the respective supporting bars 22, 22 of the third component 20 are apart from the positions of the respective supporting bars 17, 17 of the second component 15. The respective supporting bars 17, 17 of the second component 15 are fitted in the predetermined channels 13a, 13b, 13c formed in the first component 10, and the respective supporting bars 22, 22 of the third component 20 are fitted in the next channels 13a, 13b, 13c.

Next, referring to FIG. 12 and FIG. 14, the fourth component 25 will be described. The fourth component 25 is provided, within a ring portion 28 in the outer periphery thereof, with three pieces of supporting bars 27, 27 disposed parallel to each other at regular intervals, each of which has a plurality of hexagonal posts 26, 26 erected thereon at regular intervals. Each of the supporting bars 27, 27 is provided with engaging recesses 27a, 27a respectively formed between the hexagonal posts 26, 26. Also, on the rear surface of the ring portion 28 a plurality of channels 29, 29 are formed in the positions aligning with the channels 24, 24 of the third component 20.

This fourth component 25 can be fitted in the third component 20 from the rearside, and in the fitted condition the ring portion 28 is fitted into the outer periphery of the ring portion 23 of the third component 20. At the same time, each of the supporting bars 27, 27 is fitted in the predetermined channels 13a, 13b, 19, 24 of the first component 10, the second component 15 and the third component 20 respectively, so that those ring portions 12, 18, 23, 28 are integrally connected in a flush condition. At this time, the channels 13c, 13c formed on the rear surface of the respective hexagonal posts 11 of the first component 10 and the engaging recesses 27a, 27a of the fourth component 25 are engaged with each other so as to form a integral fitting condition. In this fitting condition of the fourth component 25, as shown in the front view of FIG. 2, three rows of the hexagonal posts 26, 26 are disposed among the predetermined hexagonal posts 11, 11 of the first component 10.

Incidentally, the positions of the respective supporting bars 27, 27 of the fourth component 25 are apart from the positions of the respective supporting bars 17, 17, 22, 22 of the second component 15 and the third component 20. The respective supporting bars 17, 17, 22, 22 of the second component 15 and the third component 20 are fitted in the predetermined channels 13a, 13b, 13c formed in the first component 10, and the respective supporting bars 27, 27 of the fourth component 25 are fitted in the next channels 13a, 13b, 13c.

Next, referring to FIG. 15 and FIG. 16, the fifth component 30 will be described. The fifth component 30 is provided, within a ring portion 33 in the outer periphery thereof, with four pieces of supporting bars 32, 32 disposed parallel to each other at regular intervals, each of which has a plurality of hexagonal posts 31, 31 erected thereon at regular intervals. Each of the supporting bars 32, 32 is provided with engaging recesses 32a, 32a respectively formed between the hexagonal posts 31, 31.

This fifth component 30 can be fitted in the fourth component 25 from the rearside, and in the fitted condition the ring portion 33 of the fifth component 30 is fitted into the outer periphery of the ring portion 28 of the fourth component 25. At the same time, each of the supporting bars 32, 32 is fitted in the predetermined channels 13a, 13b, 19, 24, 29 of the first component 10, the second component 15, the third component 20 and the fourth component 25 respectively, so that those ring portions 12, 18, 23, 28, 33 are integrally connected in a flush condition. At this time, the channels 13c, 13c formed on the rear surface of the respective hexagonal posts 11 of the firsr component 10 and the engaging recesses 32a, 32a of the fifth component 30 are engaged with each other so as to form a integral fitting condition. In this fitting condition of the fifth component 30, as shown in the front view of FIG. 2, four rows of the hexagonal posts 31, 31 are disposed among the predetermined hexagonal posts 11, 11 of the first component 10.

Incidentally, the positions of the respective supporting bars 32, 32 of the fifth component 30 are apart from the positions of the respective supporting bars 17, 17, 22, 22, 27, 27 of the second component 15, the third component 20 and the fourth component 25. The respective supporting bars 17, 17, 22, 22, 27, 27 of the second component 15, the third component 20 and the fourth component 25 are fitted in the predetermined channels 13a, 13b, 13c formed in the first component 10, and the respective supporting bars 32, 32 of the fifth component 30 are fitted in the next channels 13a, 13b, 13c.

Accordingly, when one after another fitted into the first component 10 from the rear side are the second, the third, the fourth and the fifth comonent 15, 20, 25, 30, as shown in FIG. 2, the respective hexagonal posts 16, 16, 21, 21, 26, 26, 31, 31 are disposed among the respective hexagonal posts 11, 11 of the first component 10 to form the predetermined gaps constituting the cell holes S, S. It results in forming a honeycomb pattern as a whole, as shown in FIG. 2, and forming the cell holes S, S continuously penetrating from the front side to the rear side among the respective hexagonal posts 11, 11, 16, 16, 21, 21, 26, 26, 31, 31. In the integrated condition of the five components into a unit, as shown in FIG. 2, the ring portions 12, 18, 23, 28, 33 of the respective components are mounted on the peripheral retainer 8 as shown in FIG. 5, in a flush condition. That is, the ring portion 33 of the fifth component 30 is fitted into the inner periphery of the fitting recess 8b of the peripheral retainer 8 and the integrated ring portions are brought into contact with the inside of the fitting recess 8b from the rear side thereof. Then, the hexagonal posts 11, 16, 21, 26, 31 arranged in a honeycomb pattern are projectingly disposed in the central hole 8a of the peripheral retainer 8.

In this embodiment as described above, the die 9 to be mounted on the extruder 1 is detachable into five components and capable of reassembling, so that it is easy to be cleaned with brush or the like after dismantling the die 9 into the respective components. Besides, the extruding die 9 has the cell holes S extending straight from the rear side to the front side in the same diameter, so that it suffers no unreasonable force during the extrusion and it can reduce cracks and strains occurring on the product.

Figure 17:
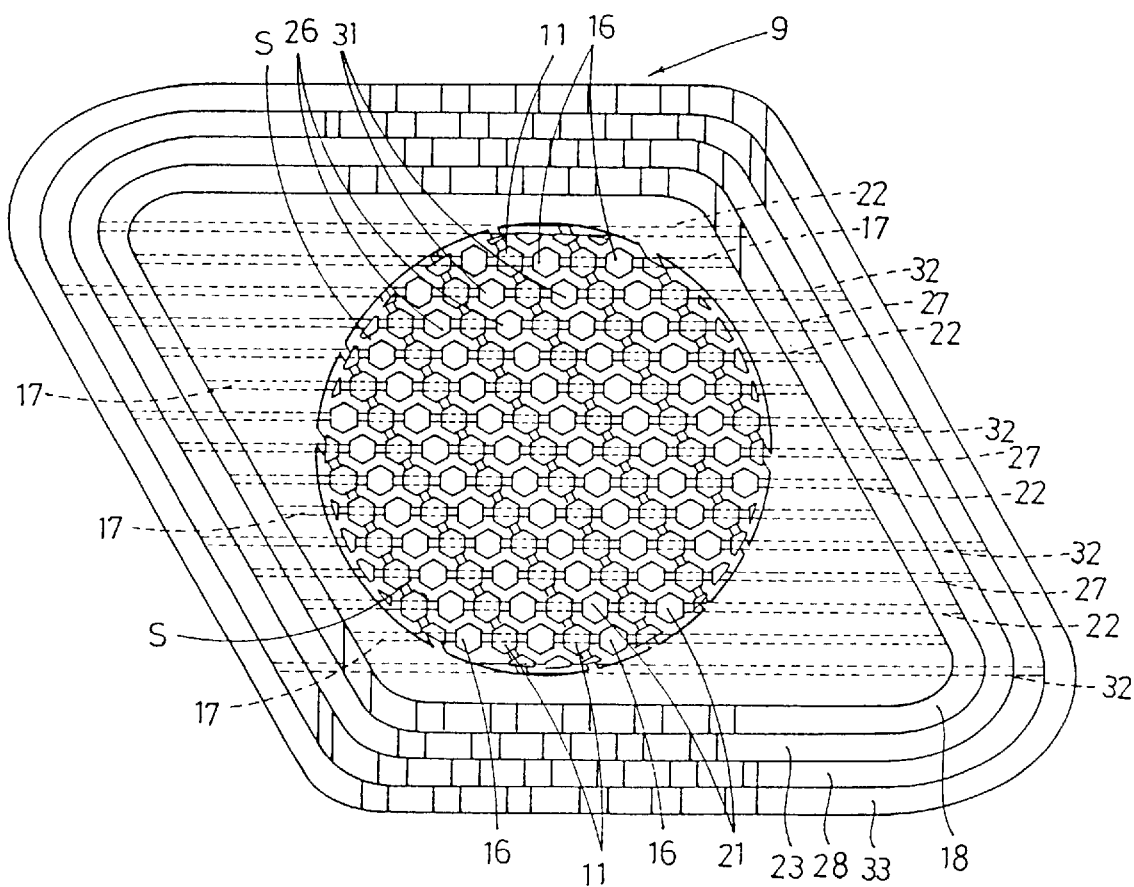
FIG. 17 is a front view of an assembled condition of a die having a square-formed periphery.

FIG. 17 shows another embodiment, in which the extruding die has detachable ring portions of square form. When the periphery is made in a square form, the extruding die has an effect that centering work is facilitated.

Figure 18:
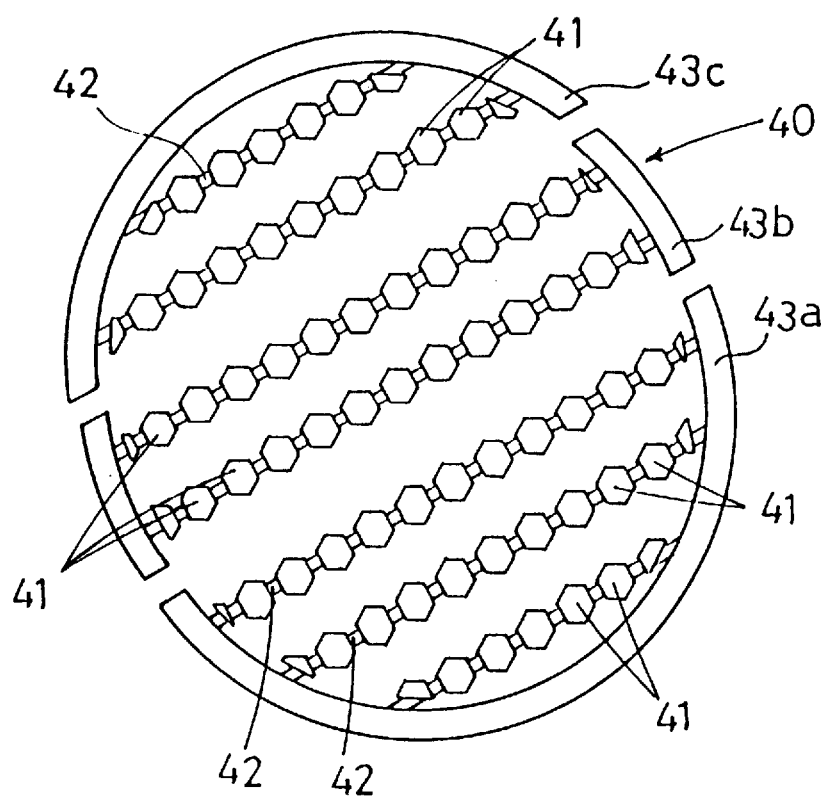
FIG. 18 is a front view of a divided condition of the second component of a two-dividing type die.
Figure 19:
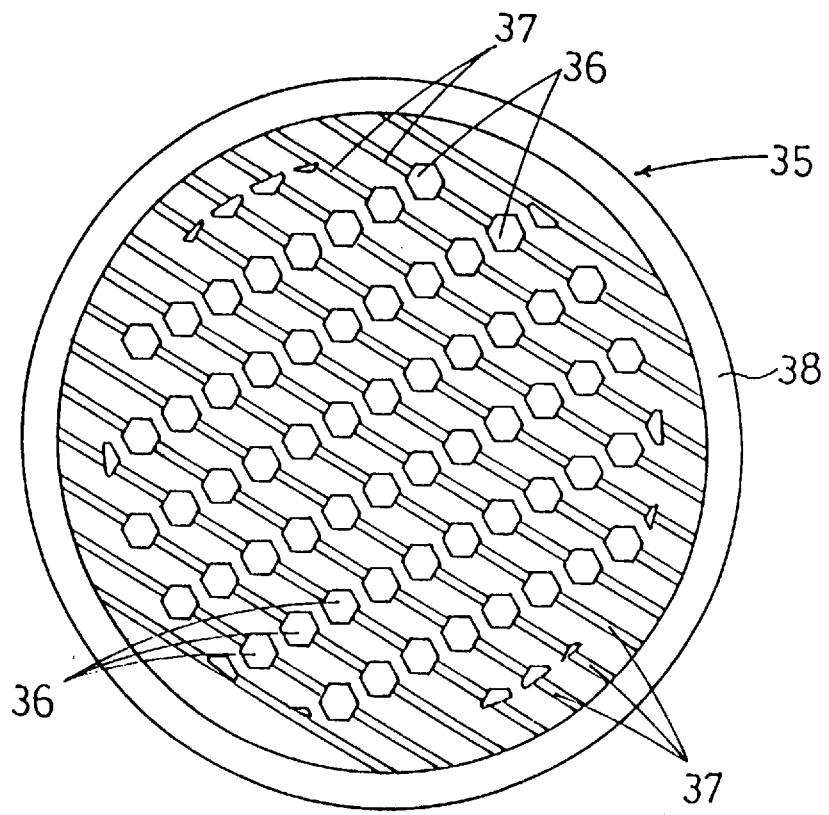
FIG. 19 is a front view of the first component of the two-dividing type die.
Figure 20:
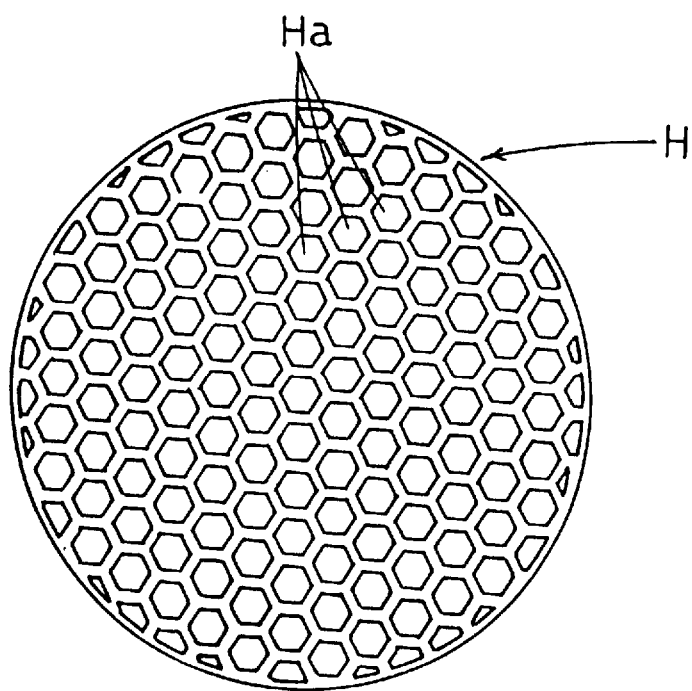
FIG. 20 is a sectional front view of an extruded honeycomb structure.
Figure 21:
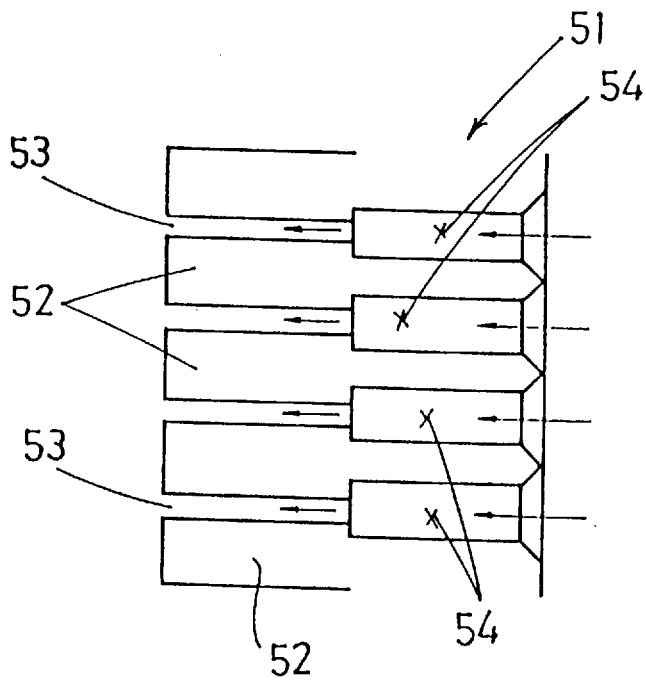
FIG. 21 is a side view of an extruding die in the prior art.
Figure 22:
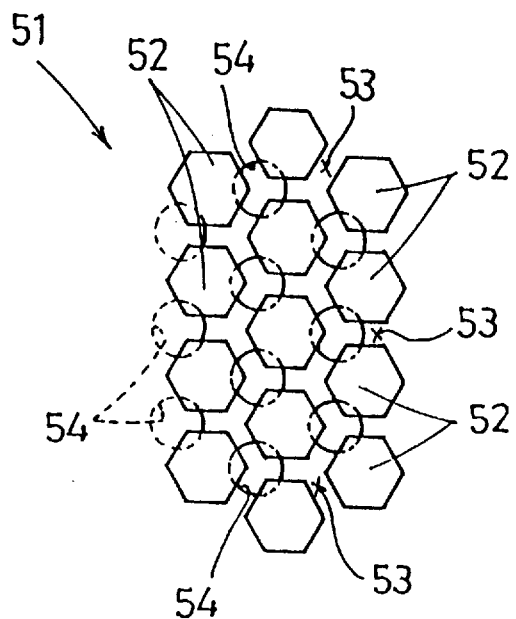
FIG. 22 is a front view of an arrangement of the cell holes and feed paths of an extruding die in the prior art.
Figure 23:
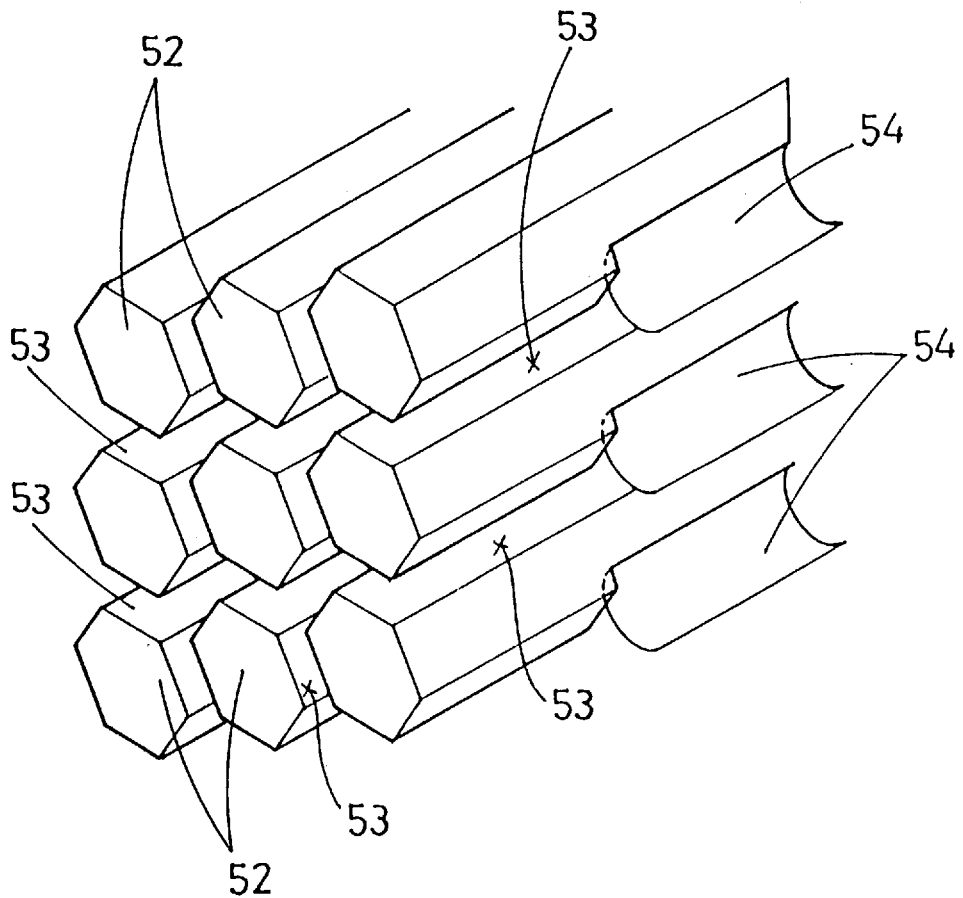
FIG. 23 is an enlarged perspective view of the principal portion of an extruding die in the prior art.

Moreover, shown in FIG. 18 and FIG. 19 is a further embodiment in which the extruding die 9 is composed of a first component 35 and a second component 40. The first component 35 has a plurality of supporting bars 37, 37 formed at regular intervals within a ring portion 38 in the periphery thereof. Each of the supporting bars 37 is provided with hexagonal posts 36, 36 erected thereon at regular intervals. Next, the second component 40 is constituted so that the ring portion may be laterally divided into three pieces. within each of the ring portion 43a, 43b, 43c, supporting bars 42, 42, 42 are respectively disposed parallel to each other, each of them having a plurality of hexagonal posts 41, 41, 41 erected thereon at regular intervals. The first component 35 and the second component 40 are fitted into each other and integrated into a unit. The hexagonal posts 41, 41, 41 of the second component 40 are disposed among the respective hexagonal posts 36, 36, 36 of the first component 35 so as to constitue cell holes in an honeycomb pattern as a whole. Also in this embodiment, since the extruding die 9 can be dismantled into the first component 35 and the second component 40, the cleaning is facilitated. Besides, since the second component 40 can be laterally divided, it is easy to be cleaned and easy to be manufactured. Moreover, also in this embodiment, the extruding die 9 has cell holes penetrating straight from the rear side to the front side in the same diameter, so that it suffers no unreasonable force during the extrusion and prevents cracks and strains from occurring on the product.

Still further, although in the above embodiments, the extruding die is described as a honeycomb structure having a plurality of six-sided cells by using hexagonal posts, it is possible to constitue a detachable extruding die as a similar structure by using square posts.

What is claimed is:

1. An extruding die to be fitted in a peripheral retainer secured to an extruder for extruding a honeycomb structure comprising at least two components, a first component and a second component which are detachable;

said first component including a plurality of first supporting bars disposed parallel to each other at regular intervals and disposed within a first ring portion, each of said first supporting bars connecting a plurality of first hexagon posts disposed at regular intervals, each of said first hexagon posts having a first channel formed on a rear surface thereof;

said second component including a plurality of second supporting bars disposed parallel to each other at regular intervals and disposed within a second ring portion, said second supporting bars intersecting said first supporting bars at an angle when said first and second components are assembled into the die;

each of said second supporting bars having a plurality of engaging recesses disposed at regular intervals for engaging said first channels of said first hexagon posts, and each of said second supporting bars having a plurality of second hexagon posts disposed at regular intervals so as to be positioned in uniformly spaced relation to said first hexagon posts when said first and second components are assembled into the die;

each of said second supporting bars having both ends for engaging second channels formed in said first ring of said first component, so that the second ring is positioned flush with the first ring of the first component when said second ring is fitted around said first ring;

whereby a plurality of cell holes are formed between said first hexagon posts and said second hexagon posts and extend straightly from a rear side to a front side of the die with a uniform sectional area throughout the die.

2. An extruding die as defined in claim 1, wherein said second ring of said second component comprises three separate ring parts for separation laterally from each other.

* * * * *